US012762579B2

(12) United States Patent
Maruyama et al.

(10) Patent No.: US 12,762,579 B2
(45) Date of Patent: Oct. 13, 2026

(54) PROVIDING A CUSTOMER WITH TARGET PRODUCT INFORMATION ON AN ONLINE SHOP

(71) Applicants: NEC Corporation, Tokyo (JP); NEC Platforms, Ltd., Kawasaki (JP)

(72) Inventors: Mikako Maruyama, Tokyo (JP); Junya Enomoto, Tokyo (JP); Tsubasa Kikuchi, Kanagawa (JP); Suzuri Uchikawa, Tokyo (JP); Takuto Matsumura, Tokyo (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 68 days.

(21) Appl. No.: 18/274,924

(22) PCT Filed: Mar. 19, 2021

(86) PCT No.: PCT/JP2021/011348
§ 371 (c)(1),
(2) Date: Jul. 28, 2023

(87) PCT Pub. No.: WO2022/195844
PCT Pub. Date: Sep. 22, 2022

(65) Prior Publication Data
US 2024/0086942 A1 Mar. 14, 2024

(51) Int. Cl.
*G06Q 30/0201* (2023.01)
*G06Q 30/0601* (2023.01)

(52) U.S. Cl.
CPC ..... *G06Q 30/0201* (2013.01); *G06Q 30/0623* (2013.01); *G06Q 30/0631* (2013.01)

(58) Field of Classification Search
CPC ........... G06Q 30/0201; G06Q 30/0623; G06Q 30/0631
See application file for complete search history.

(56) References Cited

U.S. PATENT DOCUMENTS

2011/0191162 A1* 8/2011 Blackhurst ......... G06Q 30/0239 705/14.39
2015/0269624 A1* 9/2015 Cheng ................ G06Q 30/0261 705/14.58

(Continued)

FOREIGN PATENT DOCUMENTS

JP 2008-282132 A 11/2008
JP 2014-049102 A 3/2014

(Continued)

OTHER PUBLICATIONS

C. Buaklee and S. Sinthupinyo, "Similar Cluster recommendation of Product Purchases by p. liked Analysis," 2018 10th International Conference on Electronics, Computers and Artificial Intelligence (ECAI), lasi, Romania, 2018, pp. 1-5.*

(Continued)

*Primary Examiner* — Timothy Padot
(74) *Attorney, Agent, or Firm* — Sughrue Mion, PLLC

(57) ABSTRACT

An information providing apparatus (10) includes a customer information acquisition unit (110) and a first information transmission unit (120). The customer information acquisition unit (110) acquires customer identification information and first customer information of the customer in association with each other. The first customer information includes at least one of a first purchase history being a purchase history of a customer at a real shop and an action history of the customer in the real shop. The first information transmission unit (120) generates online shop information being information to be provided to the customer in relation to an online shop by using the first customer information and transmits the online shop information to a customer terminal operated by the customer.

9 Claims, 8 Drawing Sheets

(56) References Cited

U.S. PATENT DOCUMENTS

| | | | | |
|---|---|---|---|---|
| 2015/0278859 | A1* | 10/2015 | Sundaresan | G06Q 30/0255 705/14.53 |
| 2016/0180442 | A1* | 6/2016 | Bar | G06Q 30/0631 705/26.7 |
| 2016/0284007 | A1* | 9/2016 | Sakai | G06F 16/24578 |
| 2021/0133160 | A1* | 5/2021 | Craft | G06F 16/148 |
| 2021/0233103 | A1 | 7/2021 | Suetsugi | |

FOREIGN PATENT DOCUMENTS

| | | | |
|---|---|---|---|
| JP | 2015-176322 | A | 10/2015 |
| JP | 2017-091268 | A | 5/2017 |
| JP | 2020-042644 | A | 3/2020 |
| JP | 2020-107132 | A | 7/2020 |
| JP | 2020-184211 | A | 11/2020 |
| WO | 2020/008938 | A1 | 1/2020 |

OTHER PUBLICATIONS

Retailer tech creeps into consumers' private lives. Associated Press. Daily Herald (Arlington Heights, IL) Nov. 29, 2013: 8.*

Y. Yamamoto et al., "Enhanced IoT-Aware Online Shopping System," 2016 12th International Conference on Signal-Image Technology & Internet-Based Systems (SITIS), Naples, Italy, 2016, pp. 31-35.*

D. A. Mora Hernandez, O. Nalbach and D. Werth, "How Computer Vision Provides Physical Retail with a Better View on Customers," 2019 IEEE 21st Conference on Business Informatics (CBI), Moscow, Russia, 2019, pp. 462-471.*

JP Office Action for Japanese Patent Application No. 2023-506662, mailed on Jul. 9, 2024 with English Translation.

Tomonori Yako, "Mobile Cloud", Chukei Publishing Co., Nov. 15, 2012, pp. 132-136.

International Search Report for PCT Application No. PCT/JP2021/011348, mailed on Jun. 22, 2021.

English translation of Written opinion for PCT Application No. PCT/JP2021/011348, mailed on Jun. 22, 2021.

Tomonori Yako, Mobile Cloud, Chukei Publishing Co., Masanori Kawakane, Nov. 15, 2012, pp. 134-135.

* cited by examiner

FIG. 3

30

| CUSTOMER IDENTIFICATION INFORMATION | FIRST PURCHASE HISTORY | ACTION HISTORY |
|---|---|---|
| A | ··· | ··· |
| B | ··· | ··· |
| ⋮ | ⋮ | ⋮ |

FIG. 4

40

| CUSTOMER IDENTIFICATION INFORMATION | SECOND PURCHASE HISTORY | BROWSING HISTORY |
|---|---|---|
| A | ⋯ | ⋯ |
| B | ⋯ | ⋯ |
| ⋮ | ⋮ | ⋮ |

FIG. 5

140

| PRODUCT IDENTIFICATION INFORMATION | INFORMATION FOR ONLINE SHOP | INFORMATION FOR REAL SHOP |
|---|---|---|
| 001 | COUPON INFORMATION<br>ADVERTISEMENT INFORMATION | COUPON INFORMATION<br>ADVERTISEMENT INFORMATION |
| 002 | ADVERTISEMENT INFORMATION | ADVERTISEMENT INFORMATION |
| ⋮ | ⋮ | ⋮ |

PROVIDING A CUSTOMER WITH TARGET PRODUCT INFORMATION ON AN ONLINE SHOP

This application is a National Stage Entry of PCT/JP2021/011348 filed on Mar. 19, 2021, the contents of all of which are incorporated herein by reference, in their entirety.

TECHNICAL FIELD

The present invention relates to an information providing apparatus, an information providing method, and a program.

BACKGROUND ART

Cases of customers purchasing products at online shops are increasing in recent years. For example, Patent Document 1 describes transmitting coupon information related to a product purchased through a customer terminal to a mail address of a customer.

On the other hand, since a product can be actually seen at a real shop, there are many cases of customers purchasing products at real shops. Patent Document 2 describes the following technology. First, by integrating actions on a site on the Internet and past actions at a real shop, an integrated action management server generates integrated action history information of a person and generates purchase prediction information by using the integrated action history information. Then, in order to promote sales at the real shop, the information distribution server distributes sales promotion information to a customer terminal, based on the purchase prediction information.

RELATED DOCUMENT

Patent Document

Patent Document 1: Japanese Patent Application Publication No. 2014-049102

Patent Document 2: International Application Publication No. WO 2020/008938

SUMMARY OF INVENTION

Technical Problem

The present inventor considers that use of information about a customer at a real shop enables provision of useful information about an online shop to the customer. An example of an object of the present invention is to provide useful information about an online shop to a customer by using information about the customer at a real shop.

Solution to Problem

The present invention provides an information providing apparatus including:

a customer information acquisition unit that acquires first customer information including at least one of a first purchase history being a purchase history of a customer at a real shop and an action history of the customer in the real shop; and a first information transmission unit that generates online shop information being information to be provided to the customer in relation to an online shop by using the first customer information and transmits the online shop information to a customer terminal operated by the customer.

The present invention provides an information providing method for performing, by a computer:

customer information acquisition processing of acquiring first customer information including at least one of a first purchase history being a purchase history of a customer at a real shop and an action history of the customer in the real shop; and first information transmission processing of generating online shop information being information to be provided to the customer in relation to an online shop by using the first customer information, and transmitting the online shop information to a customer terminal operated by the customer.

The present invention provides an information providing method for performing, by a computer:

customer information acquisition processing of acquiring first customer information including at least one of a first purchase history being a purchase history of a customer at a real shop and an action history of the customer in the real shop; and first information transmission processing of generating online shop information being information to be provided to the customer in relation to an online shop by using the first customer information, and transmitting the online shop information to a customer terminal operated by the customer.

Advantageous Effects of Invention

The present invention can provide useful information about an online shop to a customer by using a history of the customer at a real shop.

BRIEF DESCRIPTION OF THE DRAWINGS

The aforementioned object, and other objects, features, and advantages will become more apparent by use of the following preferred example embodiments and accompanying drawings.

FIG. 3 is a diagram illustrating an example of information stored by a real shop information storage unit.

FIG. 4 is a diagram illustrating an example of information stored by an online shop information storage unit.

FIG. 5 is a diagram illustrating an example of information stored by a provided information storage unit.

DESCRIPTION OF EMBODIMENTS

Example embodiments of the present invention will be described below by using drawings. Note that in every drawing, similar components are given similar signs, and description thereof is not repeated as appropriate.

Figure 1:
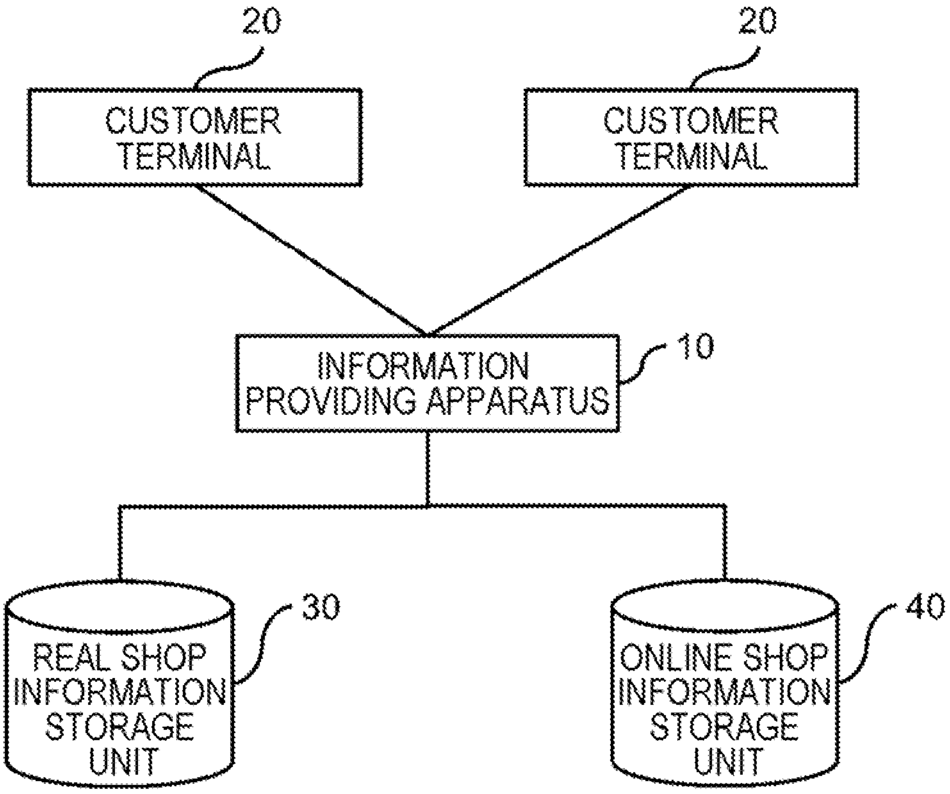
FIG. 1 is a diagram illustrating a use environment of an information providing apparatus.

FIG. 1 is a diagram illustrating a use environment of an information providing apparatus 10 according to an example embodiment. The information providing apparatus 10 is used with a customer terminal 20, a real shop information storage unit 30, and an online shop information storage unit 40.

The customer terminal 20 is a terminal operated by a customer. Examples of the customer terminal 20 include mobile terminals such as a smartphone and a tablet terminal. The real shop information storage unit 30 stores information about a customer at a real shop (hereinafter described as first customer information). The online shop information storage unit 40 stores information about a customer at an online shop (hereinafter described as second customer information). Then, the information providing apparatus 10 generates information to be provided to a customer in relation to the online shop (hereinafter described as online shop information) by using the information stored in the real shop information storage unit 30 and transmits the online shop information to the customer terminal 20. Further, the information providing apparatus 10 generates information to be provided to a customer in relation to the real shop (hereinafter described as real shop information) by using the information stored in the online shop information storage unit 40 and transmits the real shop information to the customer terminal 20.

The real shop information storage unit 30 may be a server managing products at the real shop. Further, the online shop information storage unit 40 may be a server managing the online shop.

Note that the information providing apparatus 10 may transmit the online shop information at any timing, and the information providing apparatus 10 may provide the real shop information at any timing. The information providing apparatus 10 may periodically transmit the online shop information and the real shop information to the customer terminal 20 or may transmit the pieces of information to the customer terminal 20 when the customer terminal 20 makes a request.

Note that an online shop targeted by the information providing apparatus 10 is preferably operated by a real shop targeted by the information providing apparatus 10. However, the online shop may not be related to the real shop.

Figure 2:
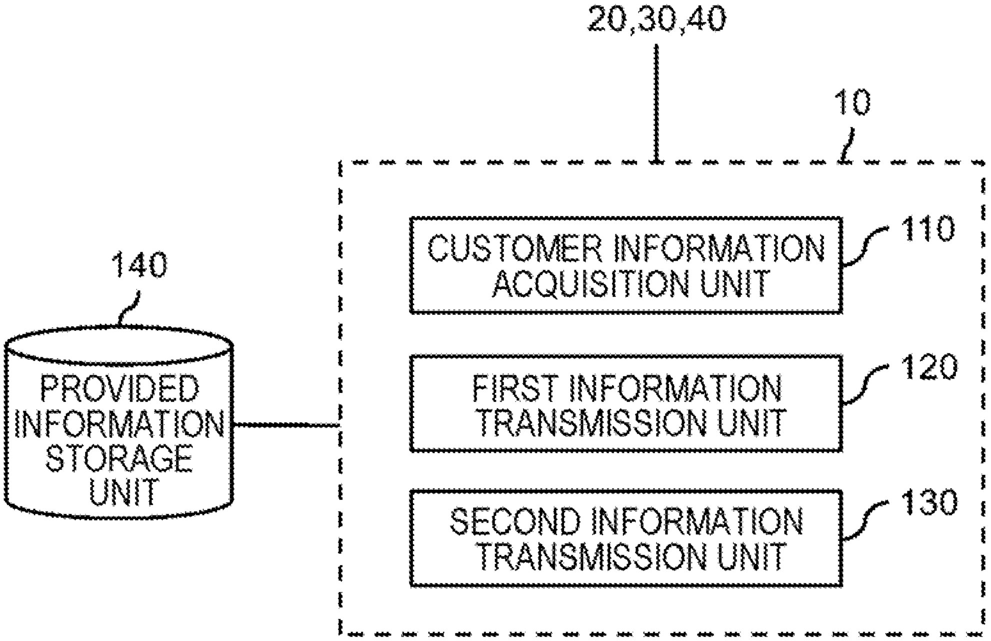
FIG. 2 is a diagram illustrating an example of a functional configuration of the information providing apparatus.

FIG. 2 is a diagram illustrating an example of a functional configuration of the information providing apparatus 10. The information providing apparatus 10 includes a customer information acquisition unit 110, a first information transmission unit 120, and a second information transmission unit 130.

The customer information acquisition unit 110 acquires information for identifying each customer (hereinafter described as customer identification information) and first customer information of the customer in association with each other. The customer identification information is common between a real shop and an online shop. Examples of the customer identification information include a member ID but are not limited thereto. As described above, the first customer information is information about a customer at a real shop. For example, the first customer information includes at least one of a purchase history of a customer at a real shop (hereinafter described as a first purchase history) and an action history of the customer in the real shop.

Further, the customer information acquisition unit 110 acquires customer identification information and second customer information of the customer in association with each other. As described above, the second customer information is information about a customer at an online shop. For example, the second customer information includes at least a purchase history of a customer at an online shop (hereinafter described as a second purchase history) and a browsing history of the customer at the online shop.

The first information transmission unit 120 generates the aforementioned online shop information by using first customer information acquired by the customer information acquisition unit 110 and transmits the online shop information to the customer terminal 20 operated by the customer. For example, the first information transmission unit 120 selects a product by using the first customer information and includes information about the product (hereinafter described as a first target product) at the online shop into the online shop information. For example, the online shop information is at least one type of information out of the price of a first target product, advertisement information of a product related to the first target product, and coupon information of the first target product or the product related to the first target product but is not limited thereto.

The second information transmission unit 130 generates the aforementioned real shop information by using second customer information acquired by the customer information acquisition unit 110 and transmits the real shop information to the customer terminal 20 operated by the customer. For example, the second information transmission unit 130 selects a product by using the second customer information and includes information about the product (hereinafter described as a second target product) at the real shop into the real shop information. For example, the real shop information is at least one type of information out of the price of a second target product, advertisement information of a product related to the second target product, and coupon information of the second target product or the product related to the second target product but is not limited thereto.

Note that the online shop information and the real shop information are generated by using information stored in a provided information storage unit 140. An example of information stored by the provided information storage unit 140 will be described later by using another diagram. Note that the provided information storage unit 140 may be part of the information providing apparatus 10 or may be positioned outside the information providing apparatus 10.

FIG. 3 is a diagram illustrating an example of information stored by the real shop information storage unit 30. For each customer, the real shop information storage unit 30 stores customer identification information, the aforementioned first purchase history, and the aforementioned action history. The first purchase history includes information for determining a product purchased at a real shop (for example, product identification information such as a JAN code, and/or a product name), a purchased quantity, and a date and time of purchase. The action history includes a line of flow of the customer at the real shop. When the customer stands still at a certain location in the real shop, the action history also includes information indicating the location where the customer stands still. The customer is highly likely to be intrigued by a product placed around the location where the customer stands still. Then, the first information transmission unit 120 may select the product as a product intriguing the customer. The first information transmission unit 120 may select the product as a first target product.

Note that the real shop information storage unit 30 also stores a floor map of the real shop. The floor map also includes information indicating placement of products in the real shop. Therefore, the first information transmission unit 120 can determine a product intriguing the customer by using the floor map and the action history of the customer.

Further, the action history may include information for determining a product taken in a hand of a customer (for example, product identification information such as a JAN code, and/or a product name) in the real shop. For example, the information is generated by processing an image generated by an image capture apparatus capturing an image of the inside of the shop. Thus, the first information transmission unit 120 can select a product taken in a hand of a customer in the real shop as a product intriguing the customer. Also in this case, the first information transmission unit 120 may determine the product as a first target product.

Further, when information indicating a history of the line of sight of a customer (hereinafter described as line-of-sight information) is generated in the real shop, a product in the direction of a line of sight indicated by the line-of-sight information may be determined in advance. In this case, the action history of the customer may include information for determining the product (for example, product identification information such as a JAN code, and/or a product name). Thus, the first information transmission unit 120 can select the product in the direction of the line of sight of the customer as a product intriguing the customer. Also in this case, the first information transmission unit 120 may determine the product as a first target product.

Note that the action history may include the line-of-sight information in place of the information for determining the product. In this case, the first information transmission unit 120 can select a first target product by using the floor map and the line-of-sight information.

FIG. 4 is a diagram illustrating an example of information stored by the online shop information storage unit 40. For each customer, the online shop information storage unit 40 stores customer identification information, the aforementioned second purchase history, and the aforementioned browsing history. The second purchase history includes information for determining a product purchased at an online shop (for example, product identification information such as a JAN code, and/or a product name), a purchased quantity, and a date and time of purchase. The browsing history includes information for determining a product browsed by the customer at the online shop (for example, product identification information such as a JAN code, and/or a product name), a date and time of browsing, and the length of time for which the product is browsed (hereinafter described as a browsing time). Therefore, the second information transmission unit 130 can compute a count of browsing for each product by processing the browsing history. The second information transmission unit 130 may also compute a count of browsing for each period.

FIG. 5 is a diagram illustrating an example of information stored by the provided information storage unit 140. For each product, the provided information storage unit 140 stores product identification information, information being a source of online shop information (described as INFORMATION FOR ONLINE SHOP in FIG. 5), information being a source of real shop information (described as INFORMATION FOR REAL SHOP in FIG. 5). When determining a first target product, the first information transmission unit 120 reads information related to product identification information of the first target product and uses the information as online shop information. Further, when determining a second target product, the second information transmission unit 130 reads information related to product identification information of the second target product and uses the information as real shop information.

Note that information being a source of online shop information includes at least either of advertisement information of an online shop and coupon information usable at the online shop. Further, information being a source of real shop information includes at least either of advertisement information of a real shop and coupon information usable at the real shop.

Figure 6:
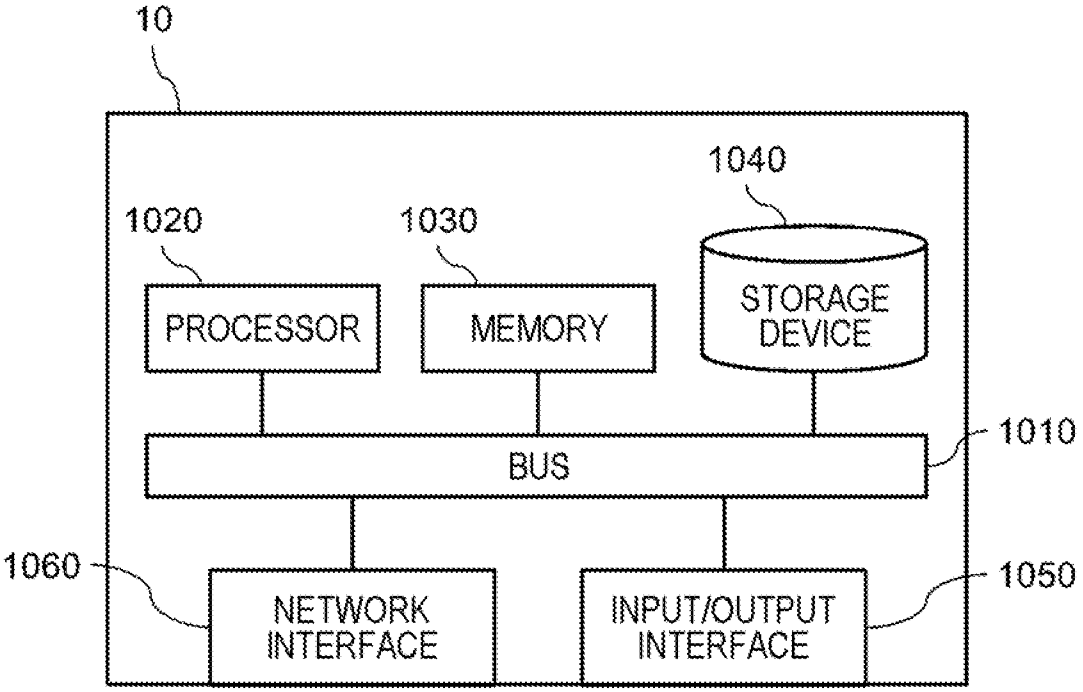
FIG. 6 is a diagram illustrating a hardware configuration example of the information providing apparatus.

FIG. 6 is a diagram illustrating a hardware configuration example of the information providing apparatus 10. The information providing apparatus 10 includes a bus 1010, a processor 1020, a memory 1030, a storage device 1040, an input-output interface 1050, and a network interface 1060.

The bus 1010 is a data transmission channel for the processor 1020, the memory 1030, the storage device 1040, the input-output interface 1050, and the network interface 1060 to transmit and receive data to and from each other. Note that the method for interconnecting the processor 1020 and other components is not limited to a bus connection.

The processor 1020 is a processor provided by a central processing unit (CPU), a graphics processing unit (GPU), or the like.

The memory 1030 is a main storage provided by a random-access memory (RAM) or the like.

The storage device 1040 is an auxiliary storage provided by a hard disk drive (HDD), a solid-state drive (SSD), a memory card, a read-only memory (ROM), or the like. The storage device 1040 stores program modules providing functions of the information providing apparatus 10 (such as the customer information acquisition unit 110, the first information transmission unit 120, and the second information transmission unit 130). By reading each program module into the memory 1030 and executing the program module by the processor 1020, each function related to the program module is provided. Further, the storage device 1040 also functions as the provided information storage unit 140.

The input-output interface 1050 is an interface for connecting the information providing apparatus 10 to various types of input/output equipment.

The network interface 1060 is an interface for connecting the information providing apparatus 10 to a network. Examples of the network include a local area network (LAN) and a wide area network (WAN). The method for connecting the network interface 1060 to the network may be a wireless connection or a wired connection. For example, the information providing apparatus 10 communicates with the customer terminal 20, the real shop information storage unit 30, and the online shop information storage unit 40 through the network interface 1060.

Figure 7:
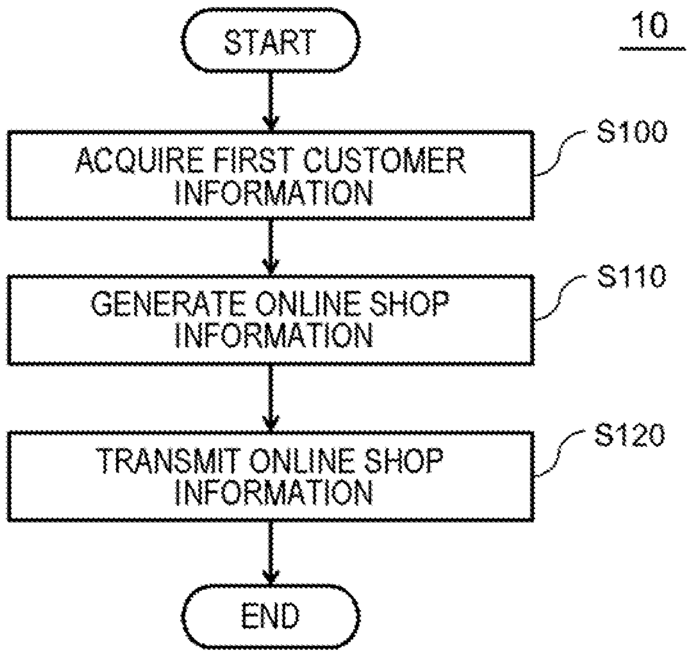
FIG. 7 is a flowchart illustrating an example of processing performed by the information providing apparatus when online information is provided to a customer terminal.

FIG. 7 is a flowchart illustrating an example of processing performed by the information providing apparatus 10 when online information is provided to the customer terminal 20. First, the customer information acquisition unit 110 in the information providing apparatus 10 reads first customer information from the real shop information storage unit 30 (Step S100). As described above, the first customer information includes a first purchase history and an action history. Next, the first information transmission unit 120 generates online shop information by using the first customer information and the provided information storage unit 140 (Step S110).

For example, the first information transmission unit 120 determines, as a first target product, a product included in the first purchase history. Then, the first information transmission unit 120 reads information for an online shop related to the first target product in the provided information storage unit 140 and includes the read information into the online shop information.

The first information transmission unit 120 may determine a first target product by narrowing down the target to a purchase history in a most recent predetermined period (such as a period equal to or longer than one month and equal to or shorter than one year). Further, the first information transmission unit 120 may select, as a first target product, a product repeatedly purchased by the customer in the predetermined period or throughout the entire period of the first purchase history, that is, a product periodically purchased by the customer.

In this case, the first information transmission unit 120 may compute a mean purchase interval of the product and generate recommended frequency information by using the mean purchase interval. The recommended frequency information includes at least one of a recommended purchase timing (such as a next timing at which the product is to be purchased) and a recommended purchase interval. For example, the recommended purchase timing is a date after an elapse of the mean purchase interval from the date of previous purchase of the product. Further, for example, the recommended purchase interval is the mean purchase interval. Then, the first information transmission unit 120 includes the recommended frequency information into the online shop information.

Further, the first information transmission unit 120 may select, as a first target product, a product an attribute of which meets a criterion out of products included in the first purchase history. For example, the first information transmission unit 120 may select a product at least one of the size and the weight of which exceeds a criterion as a first target product. Further, the first information transmission unit 120 may select a food requiring refrigerated storage as a first target product. Note that attributes used here are not limited to the above.

Note that when the first customer information includes both the first purchase history and the action history, the first information transmission unit 120 can determine a product intriguing the customer by using the action history, as described by using FIG. 3. Further, the first information transmission unit 120 can determine a product not purchased by the customer out of products intriguing the customer by further using the first purchase history. The first information transmission unit 120 may select the product as a first target product.

Subsequently, the first information transmission unit 120 transmits the online shop information to the customer terminal 20 S120).

Figure 8:
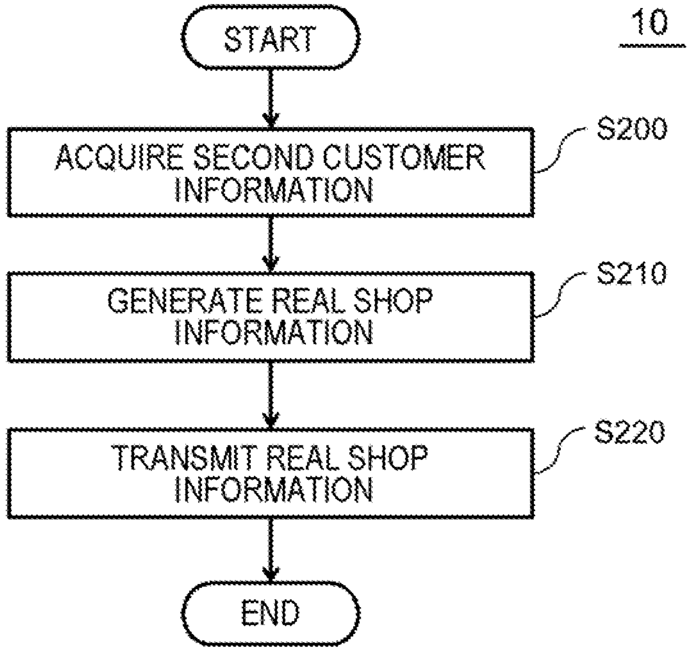
FIG. 8 is a flowchart illustrating an example of processing performed by the information providing apparatus when real shop information is provided to the customer terminal.

FIG. 8 is a flowchart illustrating an example of processing performed by the information providing apparatus 10 when real shop information is provided to the customer terminal 20. First, the customer information acquisition unit 110 in the information providing apparatus 10 reads second customer information from the online shop information storage unit 40 (Step S200). As described above, the second customer information includes a second purchase history and a browsing history. Next, the second information transmission unit 130 generates real shop information by using the second customer information and the provided information storage unit 140 (Step S210).

For example, the second information transmission unit 130 selects, as a second target product, a product included in the browsing history but not in the second purchase history. Then, the second information transmission unit 130 reads information for a real shop related to the second target product in the provided information storage unit 140 and includes the read information into the real shop information.

For each product included in the browsing history but not in the second purchase history, the second information transmission unit 130 may compute at least one of a total value of browsing time, a count of browsing, and a day count of browsing. In this case, the second information transmission unit 130 may select a product the computed value of which meets a criterion (such as exceeding a reference value) as a second target product.

Subsequently, the second information transmission unit 130 transmits the real shop information to the customer terminal 20 (Step S220).

As described above, the information providing apparatus 10 according to the present example embodiment can provide useful information about an online shop to a customer by using information about the customer at a real shop. Further, the information providing apparatus 10 can provide useful information about the real shop to the customer by using information about the customer at the online shop.

While the example embodiments of the present invention have been described above with reference to the drawings, the example embodiments are exemplifications of the present invention, and various configurations other than those described above may be employed.

Further, while a plurality of processes (processing) are described in a sequential order in each of a plurality of flowcharts used in the aforementioned description, the execution order of processes executed in each example embodiment is not limited to the order of description. The order of the illustrated processes may be modified without affecting the contents in each example embodiment. Further, the aforementioned example embodiments may be combined without contradicting each other.

The whole or part of the example embodiments disclosed above may also be described as, but not limited to, the following supplementary notes.

1. An information providing apparatus including:
   - a customer information acquisition unit that acquires first customer information including at least one of a first purchase history being a purchase history of a customer at a real shop and an action history of the customer in the real shop; and
   - a first information transmission unit that generates online shop information being information to be provided to the customer in relation to an online shop by using the first customer information and transmits the online shop information to a customer terminal operated by the customer.
2. The information providing apparatus according to aforementioned 1, wherein
   - the first customer information includes the first purchase history, and
   - the first information transmission unit determines, as a first target product, a product included in the first purchase history and includes information about the first target product at the online shop into the online shop information.
3. The information providing apparatus according to aforementioned 2, wherein
   - the first information transmission unit selects, as the first target product, a product repeatedly purchased by the customer based on the first purchase history.
4. The information providing apparatus according to aforementioned 3, wherein
   - the first information transmission unit generates recommended frequency information including at least one of a recommended purchase timing of the product and a recommended purchase interval of the product by using the first purchase history and includes the recommended frequency information into the online shop information.

5. The information providing apparatus according to any one of aforementioned 2 to 4, wherein
the first information transmission unit selects, as the first target product, a product an attribute of which meets a criterion out of one or more products included in the first purchase history.

6. The information providing apparatus according to any one of aforementioned 1 to 5, wherein
the first customer information includes both the first purchase history and the action history.

7. The information providing apparatus according to aforementioned 6, wherein
the first information transmission unit determines, as a first target product, a product intriguing the customer at the real shop but not being purchased by the customer at the real shop and includes information about the first target product at the online shop into the online shop information.

8. The information providing apparatus according to any one of aforementioned 1 to 7, wherein
the customer information acquisition unit acquires second customer information including at least one of a second purchase history being a purchase history of the customer at the online shop and a browsing history, and
the information providing apparatus further includes a second information transmission unit that generates real shop information being information to be provided to the customer in relation to the real shop by using the second customer information and transmits the real shop information to the customer terminal of the customer.

9. The information providing apparatus according to aforementioned 8, wherein
the second information transmission unit selects, as a second target product, a product being included in the browsing history but not being included in the second purchase history and includes information about the second target product at the real shop into the real shop information.

10. The information providing apparatus according to aforementioned 9, wherein
the second information transmission unit selects, as the second target product, a product at least one of a browsing time, a count of browsing, and a day count of browsing of which meets a criterion.

11. An information providing method for performing, by a computer:
customer information acquisition processing of acquiring first customer information including at least one of a first purchase history being a purchase history of a customer at a real shop and an action history of the customer in the real shop; and
first information transmission processing of generating online shop information being information to be provided to the customer in relation to an online shop by using the first customer information, and transmitting the online shop information to a customer terminal operated by the customer.

12. The information providing method according to aforementioned 11, wherein
the first customer information includes the first purchase history, and,
in the first information transmission processing, the computer determines, as a first target product, a product included in the first purchase history and includes information about the first target product at the online shop into the online shop information.

13. The information providing method according to aforementioned 12, wherein,
in the first information transmission processing, the computer selects, as the first target product, a product repeatedly purchased by the customer based on the first purchase history.

14. The information providing method according to aforementioned 13, wherein,
in the first information transmission processing, the computer generates recommended frequency information including at least one of a recommended purchase timing of the product and a recommended purchase interval of the product by using the first purchase history and includes the recommended frequency information into the online shop information.

15. The information providing method according to any one of aforementioned 12 to 14, wherein,
in the first information transmission processing, the computer selects, as the first target product, a product an attribute of which meets a criterion out of one or more products included in the first purchase history.

16. The information providing method according to any one of aforementioned 11 to 15, wherein
the first customer information includes both the first purchase history and the action history.

17. The information providing method according to aforementioned 16, wherein,
in the first information transmission processing, the computer determines, as a first target product, a product intriguing the customer at the real shop but not being purchased by the customer at the real shop and includes information about the first target product at the online shop into the online shop information.

18. The information providing method according to any one of aforementioned 11 to 17, wherein,
in the customer information acquisition processing, the computer acquires second customer information including at least one of a second purchase history being a purchase history of the customer at the online shop and a browsing history, and
the computer further performs second information transmission processing of generating real shop information being information to be provided to the customer in relation to the real shop by using the second customer information, and transmitting the real shop information to the customer terminal of the customer.

19. The information providing method according to aforementioned 18, wherein,
in the second information transmission processing, the computer selects, as a second target product, a product being included in the browsing history but not being included in the second purchase history and includes information about the second target product at the real shop into the real shop information.

20. The information providing method according to aforementioned 19, wherein,
in the second information transmission processing, the computer selects, as the second target product, a product at least one of a browsing time, a count of browsing, and a day count of browsing of which meets a criterion.

21. A program causing a computer to include:

a customer information acquisition function of acquiring first customer information including at least one of a first purchase history being a purchase history of a customer at a real shop and an action history of the customer in the real shop; and a first information transmission function of generating online shop information being information to be provided to the customer in relation to an online shop by using the first customer information, and transmitting the online shop information to a customer terminal operated by the customer.

22. The program according to aforementioned 21, wherein the first customer information includes the first purchase history, and the first information transmission function determines, as a first target product, a product included in the first purchase history and includes information about the first target product at the online shop into the online shop information.

23. The program according to aforementioned 22, wherein the first information transmission function selects, as the first target product, a product repeatedly purchased by the customer based on the first purchase history.

24. The program according to aforementioned 23, wherein the first information transmission function generates recommended frequency information including at least one of a recommended purchase timing of the product and a recommended purchase interval of the product by using the first purchase history and includes the recommended frequency information into the online shop information.

25. The program according to any one of aforementioned 22 to 24, wherein the first information transmission function selects, as the first target product, a product an attribute of which meets a criterion out of one or more products included in the first purchase history.

26. The program according to any one of aforementioned 21 to 25, wherein the first customer information includes both the first purchase history and the action history.

27. The program according to aforementioned 26, wherein the first information transmission function determines, as a first target product, a product intriguing the customer at the real shop but not being purchased by the customer at the real shop and includes information about the first target product at the online shop into the online shop information.

28. The program according to any one of aforementioned 21 to 27, wherein the customer information acquisition function acquires second customer information including at least one of a second purchase history being a purchase history of the customer at the online shop and a browsing history, and the program further causes the computer to include a second information transmission function of generating real shop information being information to be provided to the customer in relation to the real shop by using the second customer information, and transmitting the real shop information to the customer terminal of the customer.

29. The program according to aforementioned 28, wherein the second information transmission function selects, as a second target product, a product being included in the browsing history but not being included in the second purchase history and includes information about the second target product at the real shop into the real shop information.

30. The program according to aforementioned 29, wherein the second information transmission function selects, as the second target product, a product at least one of a browsing time, a count of browsing, and a day count of browsing of which meets a criterion.

REFERENCE SIGNS LIST

10 Information providing apparatus
20 Customer terminal
30 Real shop information storage unit
40 Online shop information storage unit
110 Customer information acquisition unit
120 First information transmission unit
130 Second information transmission unit
140 Provided information storage unit

What is claimed is:

1. An information providing apparatus comprising:

at least one memory configured to store instructions; and at least one processor configured to execute the instructions to perform operations, the operations comprising:

controlling a camera to capture an image of a customer standing still at a location in a real shop;

determining, by digitally processing the image, the location, in the real shop, of the customer standing still;

storing, in a storage medium, first customer information comprising:

a first purchase history, which is a purchase history of the customer at the real shop; and an action history of the customer in the real shop, the action history comprising information on the determined location in the real shop of the customer standing still;

generating, in response to the first customer information, online shop information, which is information to be provided to the customer in relation to an online shop; and transmitting the online shop information to a customer terminal operated by the customer, wherein the first customer information includes the first purchase history and the action history, and wherein the operations further comprise:

selecting, as a first target product, a product whose size or weight meets a criterion or a product requiring refrigerated storage out of one or more products included in the first purchase history and one or more products in a line-of-sight of the customer when the customer is captured as standing still at the location; and including information about the first target product at the online shop into the online shop information.

2. The information providing apparatus according to claim 1, wherein the operations further comprise selecting, as the first target product, a product repeatedly purchased by the customer based on the first purchase history.

3. The information providing apparatus according to claim 2, wherein the operations further comprise generating recommended frequency information including at least one of a recommended purchase timing of the product and a recommended purchase interval of the product by using the first purchase history and including the recommended frequency information into the online shop information.

4. The information providing apparatus according to claim 1, wherein the operations further comprise determining, as the first target product, a product among the one or more products in the line-of-sight of the customer when the customer is captured as standing still at the location but not being purchased by the customer at the real shop.

5. The information providing apparatus according to claim 1, wherein the operations further comprise:

acquiring second customer information including at least one of a second purchase history being a purchase history of the customer at the online shop and a browsing history;

generating real shop information being information to be provided to the customer in relation to the real shop by using the second customer information; and transmitting the real shop information to the customer terminal of the customer.

6. The information providing apparatus according to claim 5, wherein the operations further comprise selecting, as a second target product, a product being included in the browsing history but not being included in the second purchase history and including information about the second target product at the real shop into the real shop information.

7. The information providing apparatus according to claim 6, wherein the operations further comprise selecting, as the second target product, a product that meets at least one of a first criterion for browsing time, a second criterion for number of views and a third criterion for number of days viewed.

8. An information providing method performed by a computer, the information providing method comprising:

controlling a camera to capture an image of a customer standing still at a location in a real shop;

determining, by digitally processing the image, the location, in the real shop, of the customer standing still;

storing, in a storage medium, first customer information comprising:

at least one of a first purchase history, which is a purchase history of the customer at the real shop; and an action history of the customer in the real shop, the action history comprising information on the determined location in the real shop of the customer standing still;

generating, in response to the first customer information, online shop information, which is information to be provided to the customer in relation to an online shop; and transmitting the online shop information to a customer terminal operated by the customer and the action history, wherein the first customer information includes the first purchase history, and wherein the information providing method further comprises:

selecting, as a first target product, a product whose size or weight meets a criterion or a product requiring refrigerated storage out of one or more products included in the first purchase history and one or more products in a line-of-sight of the customer when the customer is captured as standing still at the location; and including information about the first target product at the online shop into the online shop information.

9. A non-transitory computer-readable medium storing a program for causing a computer to perform operations, the operations comprising:

controlling a camera to capture an image of a customer standing still at a location in a real shop;

determining, by digitally processing the image, the location, in the real shop, of the customer standing still;

storing, in a storage medium, first customer information comprising:

a first purchase history, which is a purchase history of the customer at the real shop; and an action history of the customer in the real shop, the action history comprising information on the determined location in the real shop of the customer standing still;

generating, in response to the first customer information, online shop information, which is information to be provided to the customer in relation to an online shop; and transmitting the online shop information to a customer terminal operated by the customer, wherein the first customer information includes the first purchase history and the action history, and wherein the operations further comprise:

selecting, as a first target product, a product whose size or weight meets a criterion or a product requiring refrigerated storage out of one or more products included in the first purchase history and one or more products in a line-of-sight of the customer when the customer is captured as standing still at the location; and including information about the first target product at the online shop into the online shop information.

* * * * *